US012600041B2

(12) United States Patent
Tomblin et al.

(10) Patent No.: US 12,600,041 B2
(45) Date of Patent: Apr. 14, 2026

(54) SURFACE ANALYST END EFFECTOR FOR INDUSTRIAL ROBOT

(71) Applicant: Wichita State University, Wichita, KS (US)

(72) Inventors: John Tomblin, Wichita, KS (US); Waruna Seneviratne, Wichita, KS (US); Caleb Saathoff, Wichita, KS (US); Upul Palliyaguru, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 669 days.

(21) Appl. No.: 18/049,419

(22) Filed: Oct. 25, 2022

(65) Prior Publication Data

US 2023/0131624 A1 Apr. 27, 2023

Related U.S. Application Data

(60) Provisional application No. 63/271,541, filed on Oct. 25, 2021.

(51) Int. Cl.

| | |
|---|---|
| *B25J 9/16* | (2006.01) |
| *B25J 15/00* | (2006.01) |
| *B25J 15/04* | (2006.01) |
| *G01B 21/30* | (2006.01) |

(52) U.S. Cl.
CPC ......... *B25J 9/1679* (2013.01); *B25J 15/0019* (2013.01); *B25J 15/0491* (2013.01); *G01B 21/30* (2013.01)

(58) Field of Classification Search
None
See application file for complete search history.

(56) References Cited

U.S. PATENT DOCUMENTS

| | | | | |
|---|---|---|---|---|
| 8,833,169 | B2 * | 9/2014 | Lute, Jr. ............... | G01N 29/225 |
| | | | | 73/633 |
| 9,082,209 | B1 * | 7/2015 | Engelbart ............... | G06F 30/00 |
| 9,179,106 | B2 * | 11/2015 | Takayama .............. | G01B 21/30 |
| 10,596,627 | B2 * | 3/2020 | Goehlich .................. | B64F 5/10 |
| 11,809,200 | B1 * | 11/2023 | Dickens ................ | B25J 9/1635 |
| 12,097,528 | B2 * | 9/2024 | Hemes ................... | B05D 3/007 |
| 2009/0249606 | A1 * | 10/2009 | Diez .................... | B25J 15/0608 |
| | | | | 29/428 |

(Continued)

*Primary Examiner* — Jethro M. Pence
(74) *Attorney, Agent, or Firm* — Stinson LLP

(57) ABSTRACT

A surface analyst end effector for an automated inspection and repair system for composite parts. A surface analyst system and a tool changer are supported on a chassis. A control unit of the surface analyst system is configured to conduct a bond readiness test by which the control unit directs an inspection head to place a drop of liquid onto a surface of a composite part and directs the inspection head to capture an image of the drop on the surface. The slave tool changer releasably and operatively connects the end effector to an industrial robot such that the industrial robot can move the end effector along the composite part and the inspection and repair system can signal the surface analyst to conduct a bond readiness test. The surface analyst end effector is interchangeable with other end effectors of the inspection and repair system for performing inspection and repair methods.

20 Claims, 14 Drawing Sheets

(56)　　　　　References Cited

U.S. PATENT DOCUMENTS

| | | | | |
|---|---|---|---|---|
| 2010/0140969 A1* | 6/2010 | Lin | ..................... | B25J 15/0052 294/86.4 |
| 2011/0043515 A1* | 2/2011 | Stathis | .................. | G05D 1/027 434/118 |
| 2011/0210110 A1* | 9/2011 | Dearman | .......... | B23K 37/0282 219/136 |
| 2012/0152877 A1* | 6/2012 | Tadayon | ................ | F24S 25/10 901/30 |
| 2012/0328395 A1* | 12/2012 | Jacobsen | ................... | B66F 9/18 414/1 |
| 2014/0022380 A1* | 1/2014 | Nissen | .................. | H04N 23/23 348/125 |
| 2014/0184786 A1* | 7/2014 | Georgeson | ........... | G01M 99/00 348/128 |
| 2014/0267694 A1* | 9/2014 | Henderkott | .......... | G06T 7/0008 348/132 |
| 2015/0140230 A1* | 5/2015 | Jones | ..................... | B22F 12/44 427/457 |
| 2015/0198547 A1* | 7/2015 | Isakov | ..................... | G01J 5/02 374/121 |
| 2015/0215584 A1* | 7/2015 | Tapia | ..................... | H04N 7/183 348/125 |
| 2015/0273760 A1* | 10/2015 | Engelbart | .............. | B29C 73/26 156/64 |
| 2017/0008184 A1* | 1/2017 | Tomblin | ................ | B26D 5/007 |
| 2017/0197324 A1* | 7/2017 | Bain | ...................... | G06T 11/20 |
| 2018/0128657 A1* | 5/2018 | Crothers | ............. | G01N 29/225 |
| 2018/0129187 A1* | 5/2018 | Spieker | ............. | G05B 19/4097 |
| 2018/0273207 A1* | 9/2018 | Hanna | .................... | B29C 73/26 |
| 2018/0361595 A1* | 12/2018 | Troy | ........................ | B25J 9/162 |
| 2019/0265178 A1* | 8/2019 | Martin | ................. | G01N 29/069 |
| 2019/0337255 A1* | 11/2019 | Tarasconi | .............. | B30B 15/028 |
| 2020/0003734 A1* | 1/2020 | Troy | .................... | G01N 29/265 |
| 2020/0238414 A1* | 7/2020 | Gu | ........................... | B23K 9/32 |
| 2020/0269439 A1* | 8/2020 | Telleria | ................. | B25J 11/005 |
| 2020/0298403 A1* | 9/2020 | Nilsson | ............. | B23Q 3/15713 |
| 2021/0003513 A1* | 1/2021 | Robbins | .......... | G01N 21/95607 |
| 2021/0154859 A1* | 5/2021 | Iijima | ................... | B25J 13/085 |
| 2021/0255145 A1* | 8/2021 | Antonio | .............. | G01N 29/043 |
| 2021/0276203 A1* | 9/2021 | Carithers | ............. | B25J 15/0441 |
| 2021/0302391 A1* | 9/2021 | Franzen | ................ | G01N 29/30 |
| 2021/0302937 A1* | 9/2021 | Ridgeway | .......... | G05B 19/4099 |
| 2021/0323167 A1* | 10/2021 | Hemes | .............. | G05B 19/4083 |
| 2022/0134691 A1* | 5/2022 | Ridgeway | .............. | G06F 30/20 156/1 |
| 2022/0142422 A1* | 5/2022 | Giarritta | ............. | A47L 11/4025 |
| 2022/0212341 A1* | 7/2022 | Mehr | .................... | B25J 9/1664 |
| 2022/0362931 A1* | 11/2022 | Wheaton | ............... | B25J 9/1653 |
| 2022/0395947 A1* | 12/2022 | Pickering | .......... | B23Q 3/15713 |
| 2023/0010426 A1* | 1/2023 | Coyne | ..................... | B25J 9/161 |
| 2023/0052634 A1* | 2/2023 | Tomblin | ................. | B29C 73/26 |
| 2023/0131624 A1* | 4/2023 | Tomblin | .................. | B25J 15/04 700/253 |
| 2023/0146116 A1* | 5/2023 | Tomblin | ............. | G01N 21/9515 356/520 |
| 2023/0146701 A1* | 5/2023 | Tomblin | ............... | B25J 15/0019 700/245 |
| 2023/0211558 A1* | 7/2023 | Sherehiy | ................ | B29C 64/25 414/749.1 |
| 2024/0018942 A1* | 1/2024 | Sadeghian | ............ | F03D 17/004 |
| 2024/0049958 A1* | 2/2024 | Sagiv | ..................... | A61B 90/70 |
| 2024/0070910 A1* | 2/2024 | Yoshida | ................... | G06T 7/11 |

* cited by examiner

10

266

2620

210

250

200

268

2622

26

24

1169

1167

50

1160

10

SURFACE ANALYST END EFFECTOR FOR INDUSTRIAL ROBOT

CROSS-REFERENCE TO RELATED APPLICATION

This application claims priority to U.S. Provisional Patent Application No. 63/271,541, filed Oct. 25, 2021, which is hereby incorporated by reference in its entirety.

FIELD

This disclosure pertains to a joint autonomous repair verification and inspection system for composite parts, and more specifically to an end effector or surface analyst tool attachable to an industrial robot for analyzing the bond readiness of surfaces of composite parts.

BACKGROUND

There is a need for an improved inspection system of composite parts. In particular, there is a need for an automated tool capable of analyzing the surfaces of composite parts prior to performing part repairs.

SUMMARY

In one aspect, a surface analyst end effector for an automated inspection and repair system for composite parts comprises a chassis. A surface analyst system is supported on the chassis for movement with the chassis. The surface analyst system includes a control unit and an analyzer inspection head. The control unit is configured to conduct a bond readiness test by which the control unit directs the analyzer inspection head to place a drop of liquid onto a surface of a composite part and direct the analyzer inspection head to capture one or more images of the drop of liquid on the surface. A slave tool changer is secured to the chassis. The slave tool changer is configured to releasably and operatively connect the surface analyst end effector to an industrial robot such that the industrial robot can move the surface analyst end effector along the composite part and signal the surface analyst to conduct a bond readiness test at one or more locations along the composite part.

In another aspect, a method of repairing a composite part comprises connecting an industrial robot to an inspection end effector and inspecting the composite part with the inspection end effector. The inspection end effector is disconnected from the industrial robot. The industrial robot is connected to a surface preparation end effector. A surface of the composite part is prepared for bonding using the surface preparation end effector to obtain a prepared surface area. The surface preparation effector is disconnected from the industrial robot. The industrial robot is connected to a surface analyst end effector, and the surface analyst end effector is used to determine bond readiness of the prepared surface area. A repair patch is subsequently adhered to the prepared surface area.

In another aspect, an automatic inspection and repair system comprises an industrial robot. A master tool changer is on an end of the industrial robot. A plurality of end effectors are interchangeably connectable to the industrial robot via the master tool changer. One of the plurality of end effectors comprises a surface analyst end effector configured to conduct a bond readiness test of a composite part. A control system is configured to control both the industrial robot and the plurality of end effectors. When the surface analyst end effector is connected to the industrial robot via the master tool changer, the control system is configured to control the industrial robot and the surface analyst end effector to coordinate robot positioning and conducting of one or more bond readiness tests using the surface analyst system to determine bond readiness.

Other aspects will be in part apparent and in part pointed out hereinafter

BRIEF DESCRIPTION OF THE DRAWINGS

Corresponding parts are given corresponding reference characters throughout the drawings.

DETAILED DESCRIPTION

The present disclosure generally pertains to a system for automating certain aspects of inspection and repair of composite parts. Additional information about such a system is provided in U.S. patent application Ser. No. 17/828,558, filed May 31, 2022, and assigned to the same assignee as the present disclosure, which is hereby incorporated by reference in its entirety. As described in U.S. patent application Ser. No. 17/828,558, an exemplary embodiment of the system is implemented to inspect and repair composite rotorcraft blades to aid in sustainment programs that ensure airworthiness. However, it will be understood that the principles of the system can be adapted for use with various other composite parts. Further, although the system described below is used in a sustainment program, it is contemplated that the inspection and repair system might also have other applications, e.g., quality control during initial manufacture.

Figure 1:
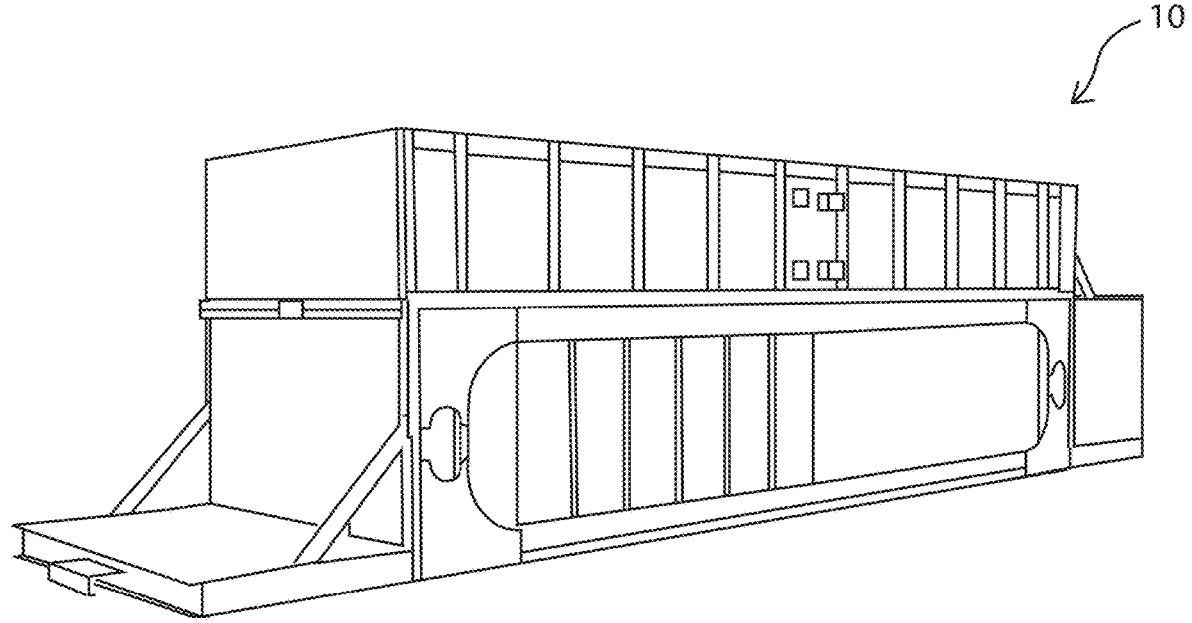
FIG. 1 is a perspective of a joint autonomous repair verification an inspection system (hereinafter, JARVIS) cell in a deployed configuration.
Figure 2:
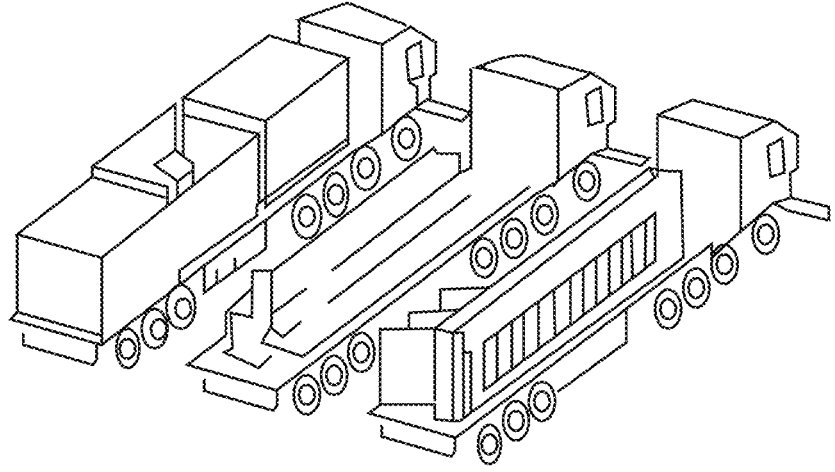
FIG. 2 is a perspective of the JARVIS cell in a transport configuration.
Figure 3:
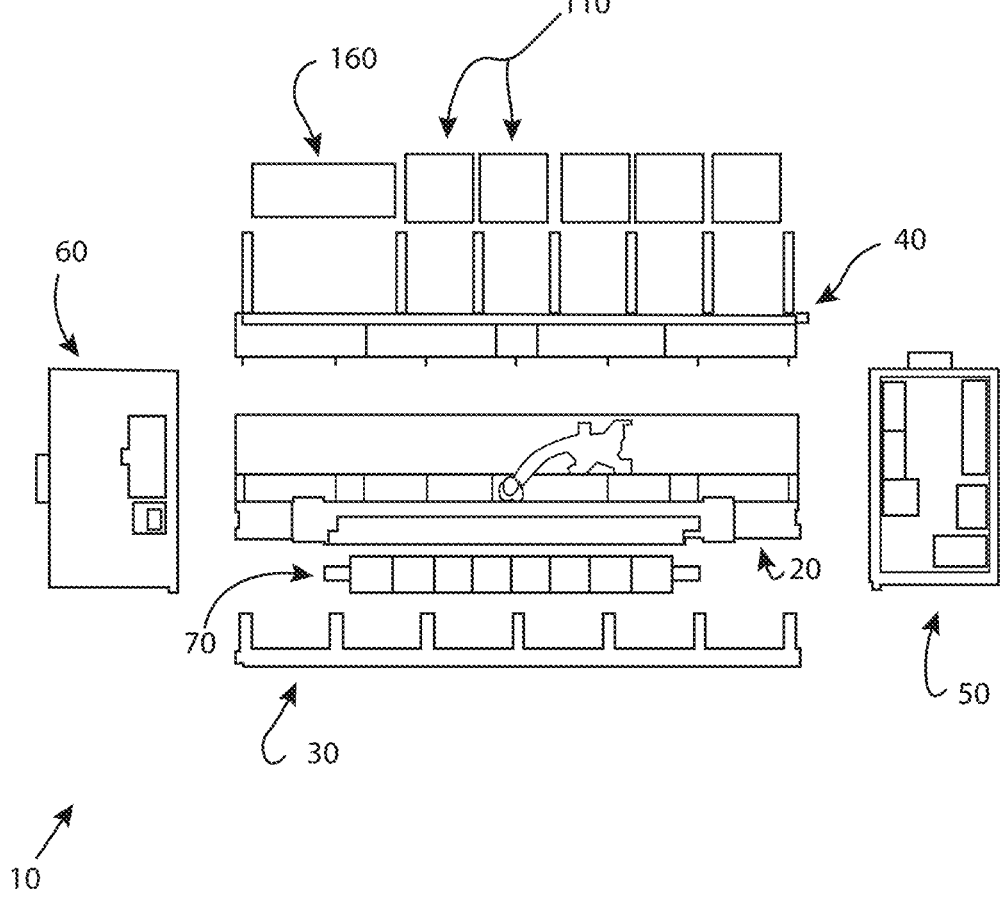
FIG. 3 is an exploded plan view of the JARVIS cell.
Figure 4:
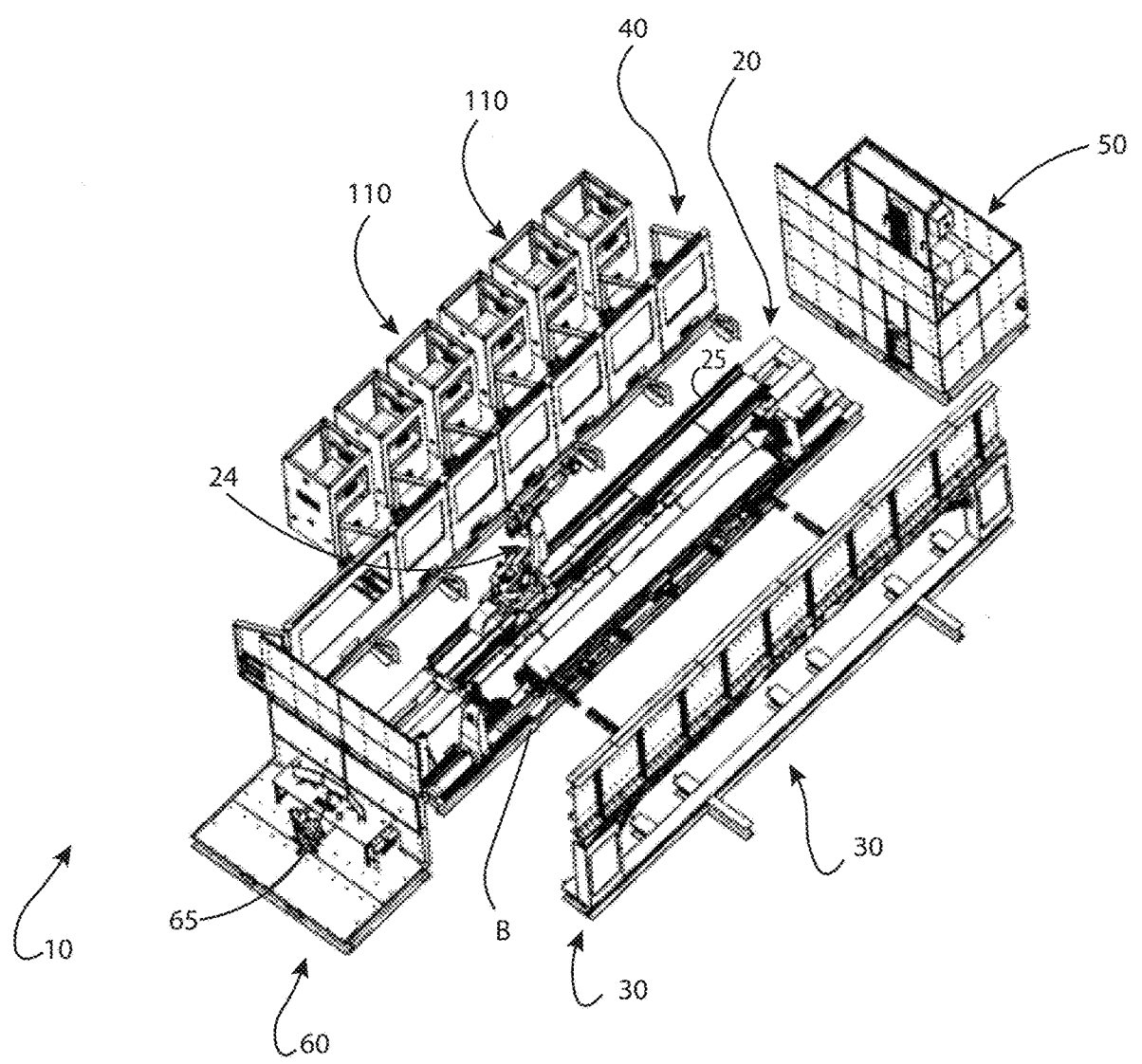
FIG. 4 is an exploded perspective of the JARVIS cell.

Referring to FIGS. 1-4, an exemplary embodiment of a joint autonomous repair verification an inspection system (hereinafter, JARVIS) cell is generally indicated at reference number 10. FIG. 1 shows the JARVIS cell 10 deployed on site, and FIG. 2 shows the JARVIS cell broken down onto three flatbed trailers for transport. Design elements for the illustrated JARVIS cell are based on intended platform size and features (e.g., the size of the cell is driven by the application-specific needs of inspecting large main rotorcraft blades). It will be understood that other embodiments can be sized appropriately for other applications.

In general, the JARVIS cell 10 comprises a blade processing station 20 (hereinafter, BPS) (broadly, a 'part processing station'), a blade induction station 30 (hereinafter, BIS) (broadly, a 'part induction station'), a tool docking station 40 (hereinafter, TDS), an equipment supply station 50 (hereinafter, ESS), a control station 60 (hereinafter, JCS), a support cart 70 (hereinafter, BSC), a set of modular tool cartridges 110 (hereinafter, MTCs), and a patch machining cartridge 160 (hereinafter, PMC). All stations can be manufactured, stored, and shipped independently to adhere to shipping size constraints. As shown in FIG. 2, in one or more embodiments, the total truck requirement for shipment is three flatbed trucks. With this configuration, MTCs 110, PMC 160, JCS 60 and ESS 50 will be transported on truck one. Truck two will transport the BPS 20 and industrial robot that has been removed from the BPS track system. Truck three transports the BIS 30 and TDS 40. All delicate instruments can be removed from the MTCs 110 and other cell locations to ensure no damage occurs during transit.

The illustrated BPS 20 broadly comprises a robot and track assembly 21 (broadly, a robot) configured to reach the full length and width of the part. In the illustrated embodiment, the robot 24 comprises a KUKA KR210 R3100 robot and the track system 25 comprises a KUKA KL4000 track system, but it will be understood that other industrial robots and track systems could also be used without departing from the scope of the disclosure. Furthermore, in certain embodiments, the BPS robot could comprise an industrial robot arm with no track system, a gantry system with no robot arm, etc., depending on the requirements of the application. The robot 24 is configured to perform all actions in the JARVIS cell 10. In the illustrated embodiment, the robot 24 is equipped with a master tool changer 26 that is configured to interchangeably connect to a plurality of different slave tool changers associated with a plurality of different robot end effectors used for different processes in the JARVIS cell.

Figure 5:
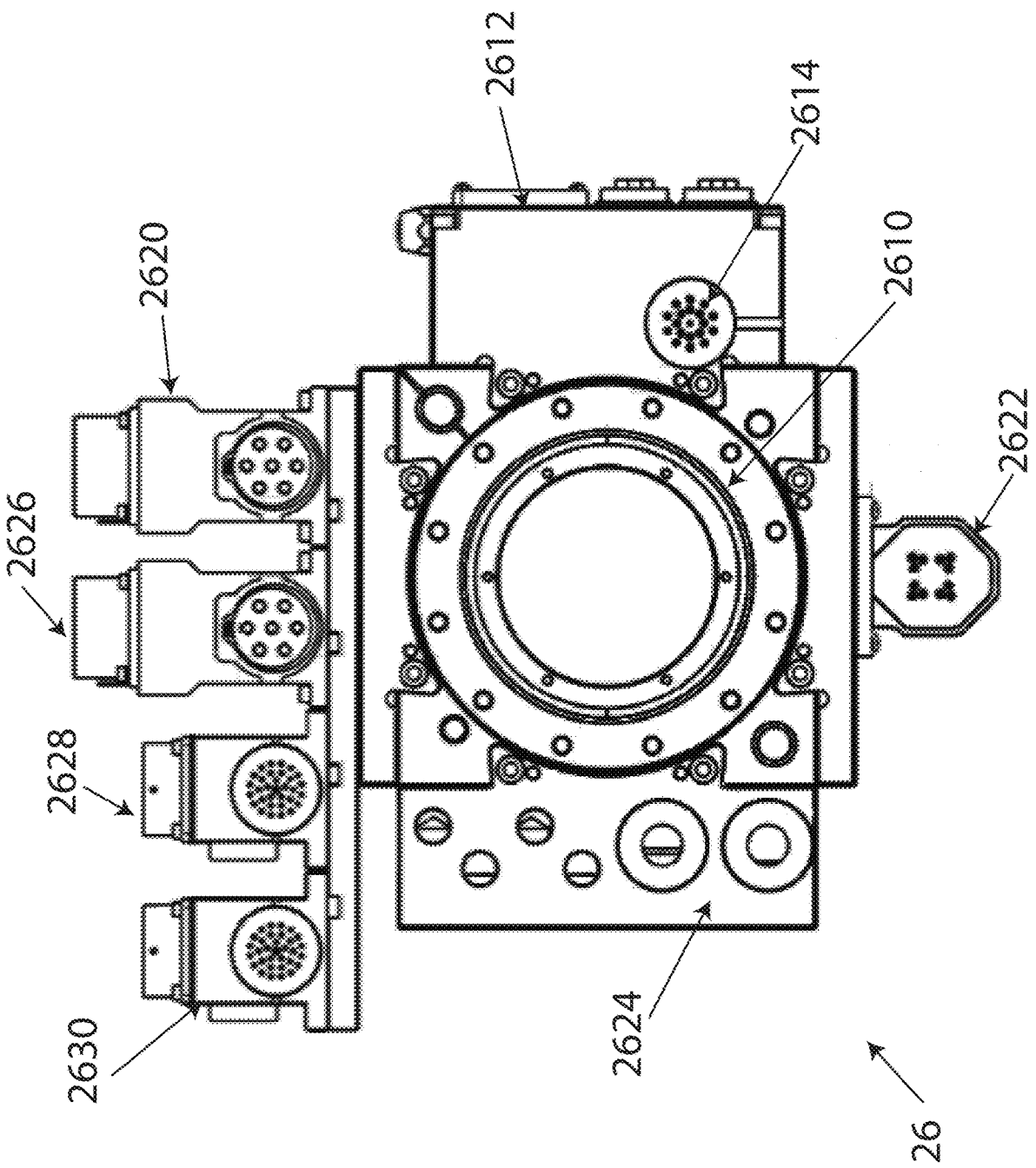
FIG. 5 is an elevation of a master tool changer of the JARVIS cell.

Referring to FIG. 5, in an exemplary embodiment, the master tool changer 26 is a custom-configured ATI quick change robotic tool changer with a plurality of connectors for interchangeably connecting the robot 24 to a plurality of different types of robot end effectors with different requirements. The master tool changer 26 comprises a mounting interface 2610 configured for interchangeably coupling to the slave tool changers of the various robot end effectors used in the JARVIS cell, whereby the master tool changer 25 mounts individual end effectors on the robot. The mounting interface 2610 comprises a pneumatic locking actuator 2612 configured to selectively lock with each slave tool changer to secure the respective end effector in place with respect to the master tool changer so that the end effector moves with the robot in relation to the composite part. As understood by those skilled in the art, the locking actuator 2612 comprises a signal connector 2614 that couples to a mating signal connector on each slave tool changer before the locking actuator actuates the locking mechanism. When the connector 2614 is mated to a mating connector of the slave tool changer, there is an exchange of signals between the master tool changer 26 and the slave tool changer by which the master tool changer determines (i) that it has been properly aligned with the slave tool changer for locking and (ii) which type of end effector it has been connected to.

In the JARVIS cell 10, the master tool changer 26 is capable of connecting the robot 24 to many different types of robot end effectors with different input/output requirements. To accommodate all of the input/output requirements, the master tool changer 26 is equipped with a standard power connector 2620, an Ethernet connector 2622, a pneumatic connector 2624, two special-purpose plasma generator connectors 2626, 2628, and a pulsed thermography connector 2630. As explained in U.S. patent application Ser. No. 17/828,558, the JARVIS cell 10 can be configured to run entirely from one 480-V connection to main power and one connection to a 120-psi compressed air source. The power connector 2620 is configured to convey power (e.g., 120-V power) from the main power source to a robot end effector. The pneumatic connector 2624 is likewise configured to convey compressed air from the compressed air source to a robot end effector. The Ethernet connector 2622 is configured pass signals between the JARVIS cell control system and the robot end effector. The thermography connector 2630 is configured to make a connection specific to a thermography end effector, and the plasma generator connectors 2626, 2628 are configured to make high voltage connections for conducting atmospheric plasma surface preparation treatment from a robot end effector.

Referring again to FIGS. 1-4, the support cart 70 is configured to support the part in the JARVIS cell 10 and facilitate transport of the part into and out of the cell. The part and the support cart 70 move into and out of the JARVIS cell through the BIS 30. And BIS 30 is configured to selectively close the JARVIS cell 10 to meet the required safety specifications of the inspection and repair operations taking place therein. The TDS 40 defines a plurality of tool docks 41 with which the MTCs 110 are configured to connect. Each MTC 110 contains a robot end effector that can attach to the end of the robot 24 for performing an inspection or repair operation.

The MTCs 110 include robotic end effectors for nondestructive testing, such as a camera, a laser three-dimensional scanner, a pulsed thermography end effector, and a shearography end effector, as well as a milling end effector, an atmospheric plasma generator (broadly, a surface preparation end effector), a composite surface preparation verification system, and a laser ablation end effector. Below this disclosure focuses on exemplary embodiments of a surface analyst end effector and its integration with the JARVIS cell and use in the JARVIS cell processes.

The power and compressed air connections are made at the ESS 50, and the human operator is stationed within the control station 60 to operate/monitor the JARVIS cell 10. Through a series of automated and/or user-controlled operations, the JARVIS cell 10 is configured to inspect and then facilitate the repair of the composite part. The JARVIS cell 10 operates in combination with a database that stores unique records of the inspection data and repairs for every composite part that is addressed by the cell.

Exemplary embodiments of certain processes that can be performed using the JARVIS cell 10 will now be briefly described. In general, the JARVIS cell 10 is configured for use in verifying and inspecting repaired composite parts such as rotorcraft blades to ensure that the part is repaired to meet required specifications. As explained more fully below, the JARVIS cell 10 can also be used to perform certain processes involved in making the necessary repairs to a composite part. The inspection methods employed using the JARVIS cell 10 can generate a robust data set with information about the composite part and repairs thereto. In addition to using these data for repair verification and making further repairs to the composite part, these data can be used outside of the cell processes in downstream continuous improvement processes.

Broadly speaking, this disclosure expressly contemplates 15 different cell processes, which will be described in detail below: (1) Blade Identification; (2) Blade Loading; (3) Virtual Scanning; (4) Digital Imaging; (5) Laser Shearography; (6) Pulsed Thermography; (7) Static Balance; (8) Core Ply and Repair Patch Design Selection; (9) Paint Removal; (10) Damage Removal; (11) Core Restoration; (12) Core Shaping; (13) Surface Preparation and Bond Readiness Testing; (14) Repair Patch Machining; and (15) Adhesive Application. This disclosure focuses on use of the cell with rotorcraft blades, but it will be understood that the same processes can be adapted for other types of composite parts.

In an exemplary process, a composite part is introduced into the cell through the BIS 30. Initially, the part is identified for purposes of maintaining the database. If the part has previously been subject to inspection or repair by the cell, an identifier for the cell can be determined by a barcode scan, text recognition, or manual entry of a known identifier for the part. Otherwise, a new database record for the part is created with a new unique identifier.

An inspection system of the cell 10 subsequently conducts a detailed nondestructive inspection of the blade. In an exemplary embodiment, the inspection includes conducting a three-dimensional laser scan of the part from which a detailed three-dimensional model of a portion of or the entirety of the part can be created. Scanning provides a foundation for all other data to be displayed and for orienting the robot in relation to the part for performing subsequent inspection and repair processes. All NDI data uses the surface model generated in the virtual scanning step to provide the end user with the ability to visualize indications of damage. Virtual scan data is also utilized in the generation of tool paths for processing and provides high-fidelity geometrical details for quality control of repair machining operations. As known to those skilled in the art, the industrial robot is controlled by reference to a robot positioning coordinate system. The JARVIS software is configured to map the three-dimensional model of the composite part to robot positioning coordinates so that subsequent robot processes are precisely coordinated to the composite part.

The inspection can further comprise taking a series of photographs of the part from one or more (e.g., all angles), conducting a pulsed thermography scan of the part, and conducting a shearography scan of the part. In one or more embodiments, a plurality of the above-described inspection steps are conducted by the robot 24. For instance, the robot can attach to a laser scanner end effector stored in one of the MTCs 110 and then perform a laser scan to obtain the three-dimensional model of the part. Subsequently, the robot can release the laser scanner into its MTC 110 and attach to a digital camera end effector stored in another MTC 110 and then take the required images of the part. The robot 24 can then release the camera end effector into its MTC 110 and attach consecutively to a shearography end effector and pulsed thermography end effector in their respective MTCs 110 to conduct shearography and pulsed thermography scanning. It will be apparent that other NDI end effectors can be used from other MTCs 110 if desired.

Upon completion of the non-destructive testing, a damage assessment system of the cell 10 is configured to create a digital twin of the part and store the digital twin in the inspection and repair database. The digital twin comprises the three-dimensional model of the part and each of the other types of non-destructive testing data wrapped onto the three-dimensional model. In an exemplary embodiment, the system uses an automatic image stitching process to stitch together a set of overlapping NDI images of one or more types of NDI data to form a composite image that is wrapped onto the three-dimensional model. For instance, one embodiment of the cell creates a stitched composite photographic image of the part, a stitched composite laser shearography image of the part, and/or a stitched composite pulsed thermography image of the part that are wrapped onto the three-dimensional model.

The digital twin is stored in the inspection and repair database for future reference and is also used to assess the part for damage. In an exemplary embodiment, the damage assessment system may automate the damage assessment process by training a convolutional neural network to identify locations of damage in the NDI images. After the damage is assessed, either by a user or a machine learning image analysis model, the cell 10 can be used to repair the composite part.

In an exemplary embodiment, a repair system of the cell 10 facilitates composite scarf joint repair and core repair. For each type of repair, paint is first removed from the repair area. In an exemplary embodiment, the robot 24 attaches to a color-selective laser ablation tool to perform the paint removal. The laser ablation end effector may suitably be held in an MTC 110 or be an internal component of the cell. In certain embodiments, the cell 10 includes a laser projection system that is configured to project an image onto the area where a repair is to be conducted. After removing paint from the area in question, skin and/or core material is removed from the part. Suitably, the robot 24 attaches to a milling end effector (which may be held in an MTC or maintained as a separate part) and uses the milling tool to automatically remove the damaged material based on coordinates generated from the nondestructive testing data.

The cell 10 can conduct a scarf repair of damaged skin of the composite part. Before machining the scarf repair patch, the cell 10 scans the area that has been prepared for repair. Based on the scan data, the system automatically generates a shape file for the scarf repair patch. A precured laminate is loaded onto a Patch Machining Cartridge 160 (PMC) of the cell 10. The robot 24 uses the milling end effector to cut the precured laminate to the determined size and shape for the scarf repair patch on the PMC 160.

In an exemplary embodiment, the robot attaches to an atmospheric plasma generator and uses the atmospheric plasma generator to prepare the surface for bonding by increasing the surface energy of the bonding surfaces.

The cell can project an image onto the surface of the composite part indicating where adhesive should be applied. A user can manually position a structural adhesive film and then position the machined scarf repair patch onto the adhesive.

For a core repair, following scarf machining and after the core material is removed, a core plug formed from the same material is machined to fit tightly into the pocket formed by removal of the damaged core section. The core plug can be formed outside of the cell in an appropriate process. Before placing the core plug into the part, the surfaces of the composite part are preferably prepared for bonding. Again, the robot 24 uses the atmospheric plasma generator to prepare the surface for adhesion. The core plug is then adhered in the desired location before the robot 24 again uses the milling end effector to shape the core plug in-place to match the contour of the part. In an exemplary embodiment, the cell 10 uses a laser projection system to project an image onto the composite part indicating the location where adhesive should be applied. Suitably, an adhesive film can be manually applied to the indicated location before placing the plug and subsequently machining the core repair to the desired contour.

When repair is complete, another inspection of the composite part can be conducted to create and store a detailed record (e.g., digital twin) of the repair. The repair records stored in the database are believed to provide utility in long-term sustainment operations. For example, a technician can evaluate the past inspection and repair records for a composite part to make a more informed assessment of whether the composite part can withstand another required repair or update.

The JARVIS cell employs a software framework that is broadly configured to (1) control the automated processes discussed above, (2) visualize the composite part and NDI data, (3) manage the JARVIS database, and (4) execute machine learning algorithms based on the NDI data and database content. The JARVIS software framework comprises a set of connected software modules executed by a processor of the JARVIS workstation 65. It will be understood that software modules comprise computer executable code stored in processor-readable memory and that one or more processors at the same or remote locations can be used to execute the code to carry out the software module's function. In an exemplary embodiment, the JARVIS cell 10 employs any combination of the following software modules: a communication module, a visualization module, an image stitching module, a database, a feature detection module (broadly, a damage assessment module), a toolpath generation module, and one or more NDI modules, such as a digital imaging module, a virtual scanning module, a thermography module, and a shearography module.

Figure 6:
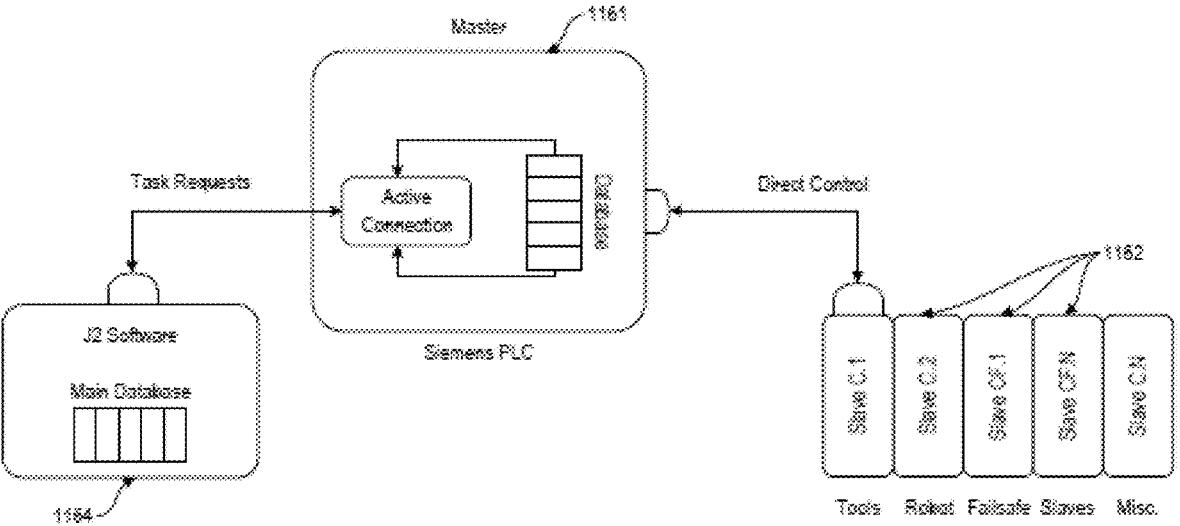
FIG. 6 is a schematic block diagram of a control system of the JARVIS cell.

Referring to FIG. 6, the JARVIS cell 10 fundamentally employs a master-slave control system 1160 comprising a main cell PLC 1161 and a plurality of slave controllers 1162 for various components of the cell. The JARVIS software framework 1164 is the front-end operation through which the operator interfaces with the system 1160 via a user interface device such as the workstation 65. The JARVIS software framework 1164 acts as an intermediary for the PLC 1161, which is used as the master, and the robot or tools, which are slaves 1162 to the PLC. Therefore, the software framework 1164 will not give commands directly to the tools or robot. With the software framework 1164 being a large collection of software modules, significant error could occur. Thus, allowing the PLC 1161 to handle routine operations for automation mitigates chances for error.

Figure 7:
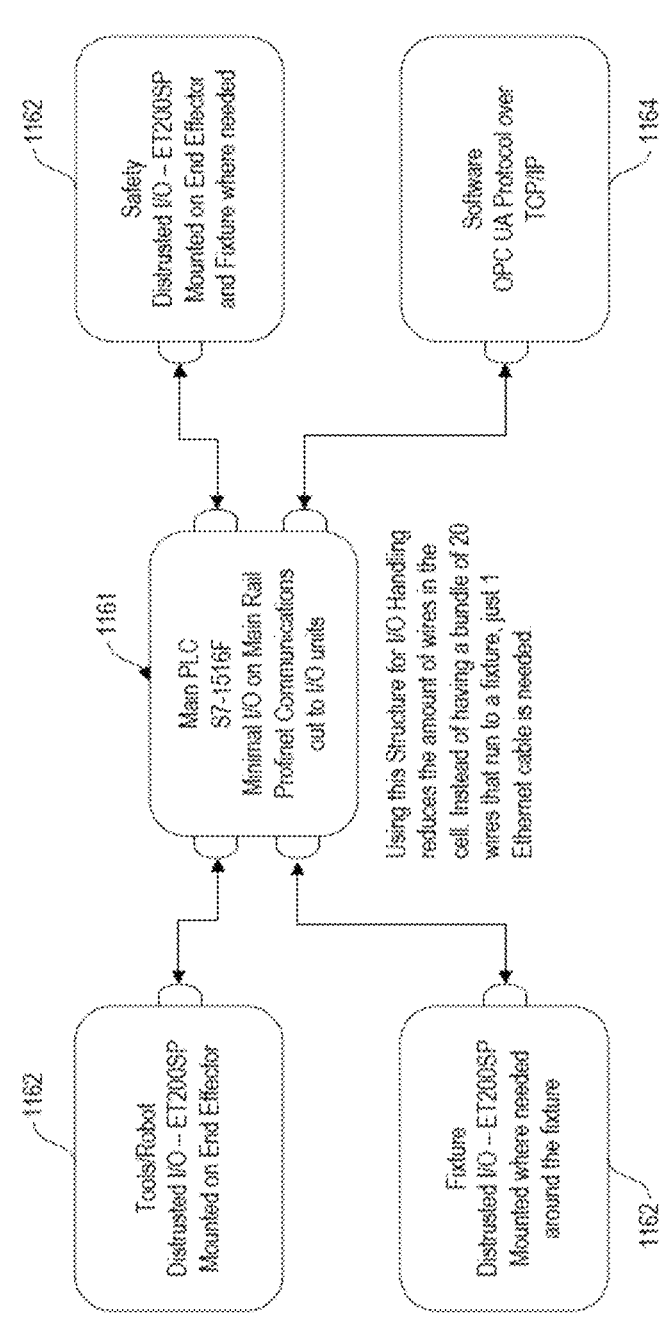
FIG. 7 is another schematic block diagram of a control system of the JARVIS cell.

In one or more embodiments, the JARVIS software framework 1164 establishes a connection directly to the PLC 1161 through an Ethernet/IP connection. The master PLC 1161 contains a local database on-board that allows it to hold and handle volatile data from the tools and robot. Any data being passed from the tools or robot 24 is transmitted through the PLC 1161 and sent directly to the software 1164. This is unless there is an alternate connection method to one of the slave units that allows data transmission directly to the software. These alternate connections are typically also Ethernet/IP connections. Ethernet/IP is the preferred connection method due to its excellent data throughput. Additionally, it allows multiple slave units over a singular connection. An overview of the connections for input/output handling are shown in FIG. 7.

The inputs and outputs of the master-slave allow the main PLC 1161 to handle most of the I/O without the software 1164 needing to poll the slave systems 1162 continuously for updated values. In one or more embodiments, the software 1164 connects to the main PLC 1161 via Open Platform Communications (OPC) using Ethernet/IP. The slave systems 1162 are typically connected via Profibus for core systems and Profisafe for safety systems.

Figure 8:
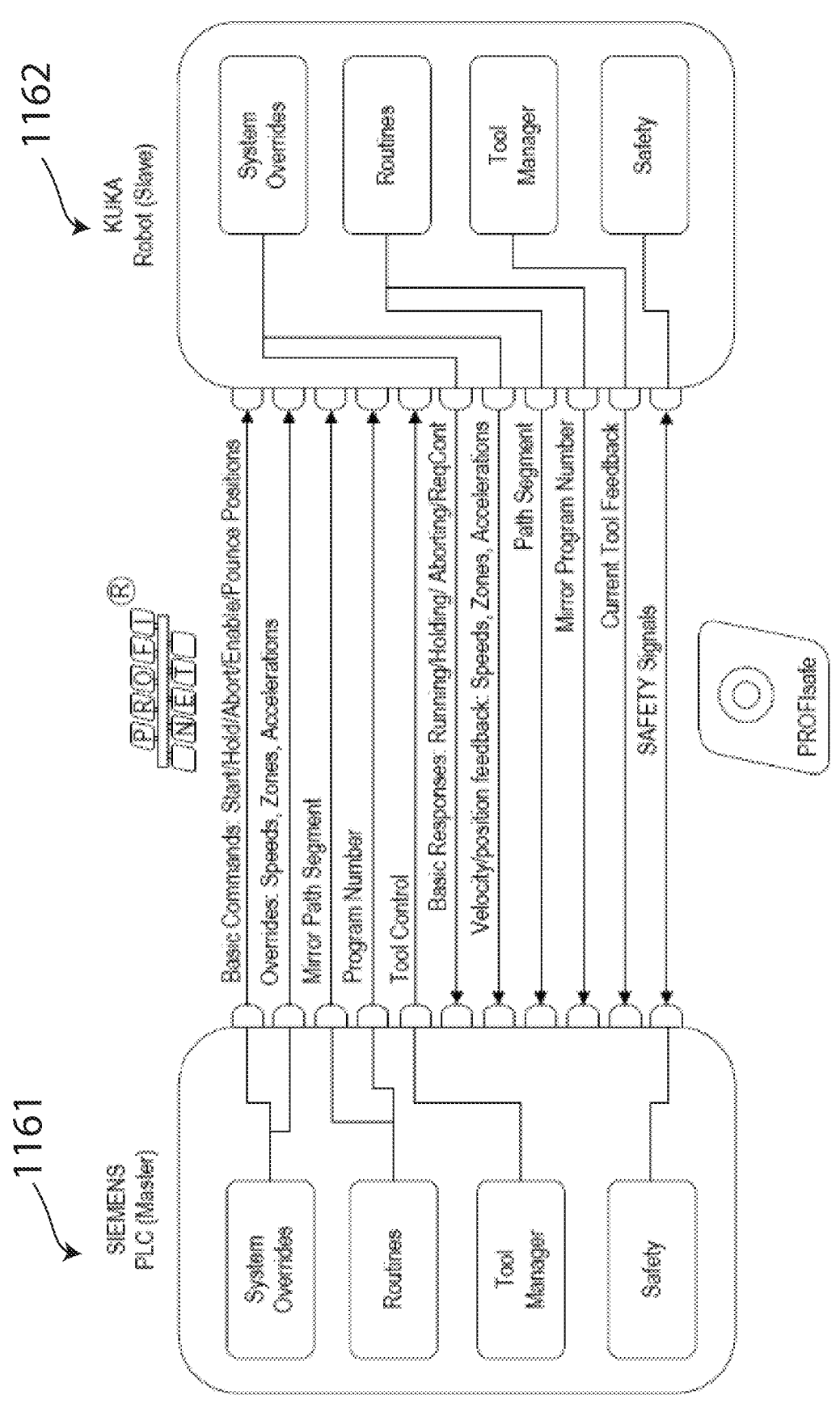
FIG. 8 is a schematic block diagram of a control subsystem of the JARVIS cell including a master PLC and a slave robot controller.

Referring to FIG. 8, the illustrated embodiment uses the Profinet protocol to handle the communication between the master and slave units 1161, 1162. Profinet is an industry technical standard that is used for communication between many factory and automation devices. Profinet establishes connection between the master and slave units 1161, 1162 using an Ethernet/IP connection for fast and reliable data transmission. The Profinet structure mimics the master-slave configuration by having an IO-Controller for the master 1161 and IO-Devices for the slaves 1162. Basic system commands like robotic movements such as start, hold, pounce, etc. are typically transmitted through the Profibus protocol. Profibus also handles the PLC routines such as program number selection, and mirroring path segments.

Figure 9:
FIG. 9 is a schematic block diagram of the JARVIS cell operatively connected to a surface analyst end effector.
Figure 10:
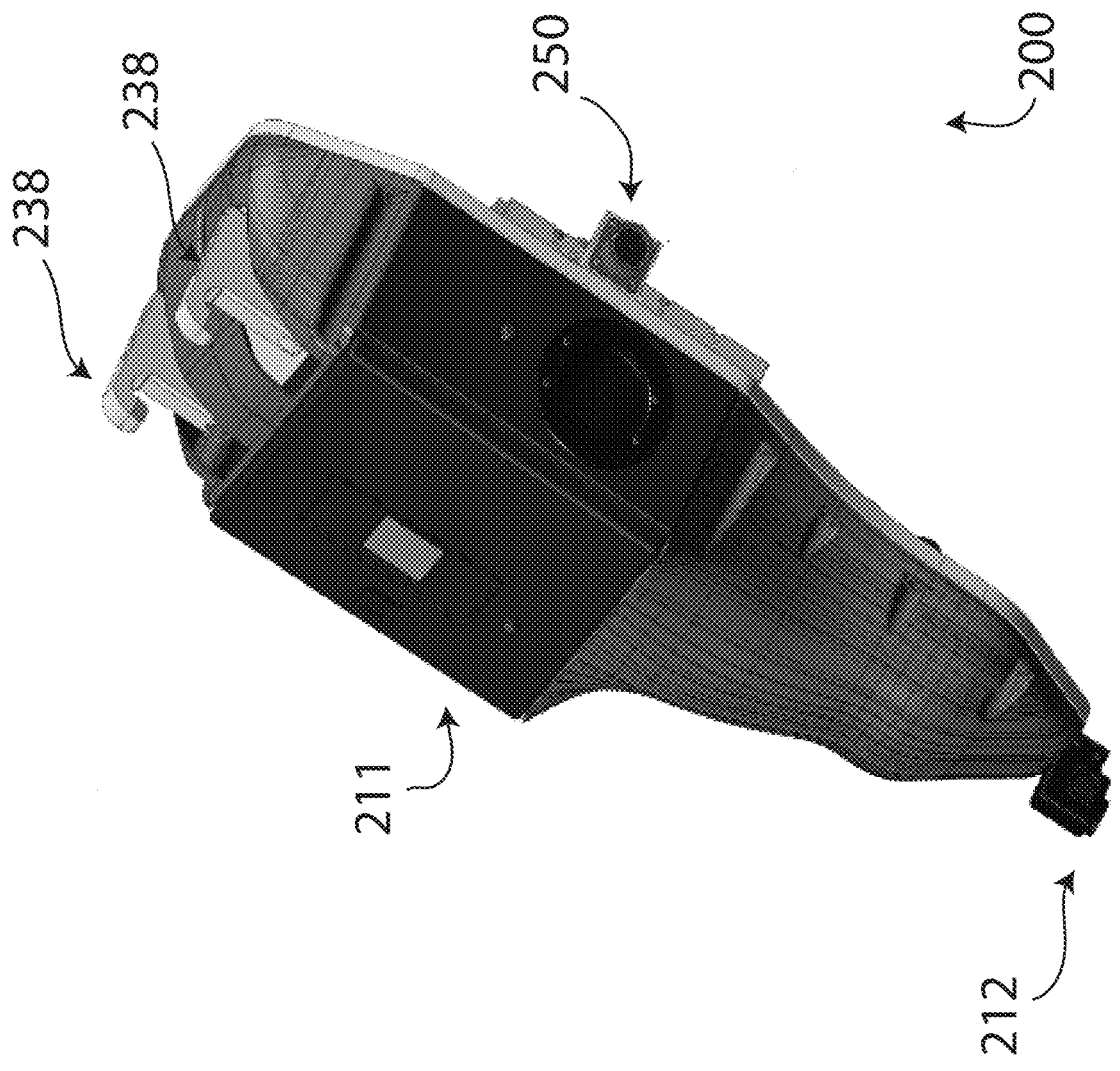
FIG. 10 is a perspective of the surface analyst end effector.
Figure 11:
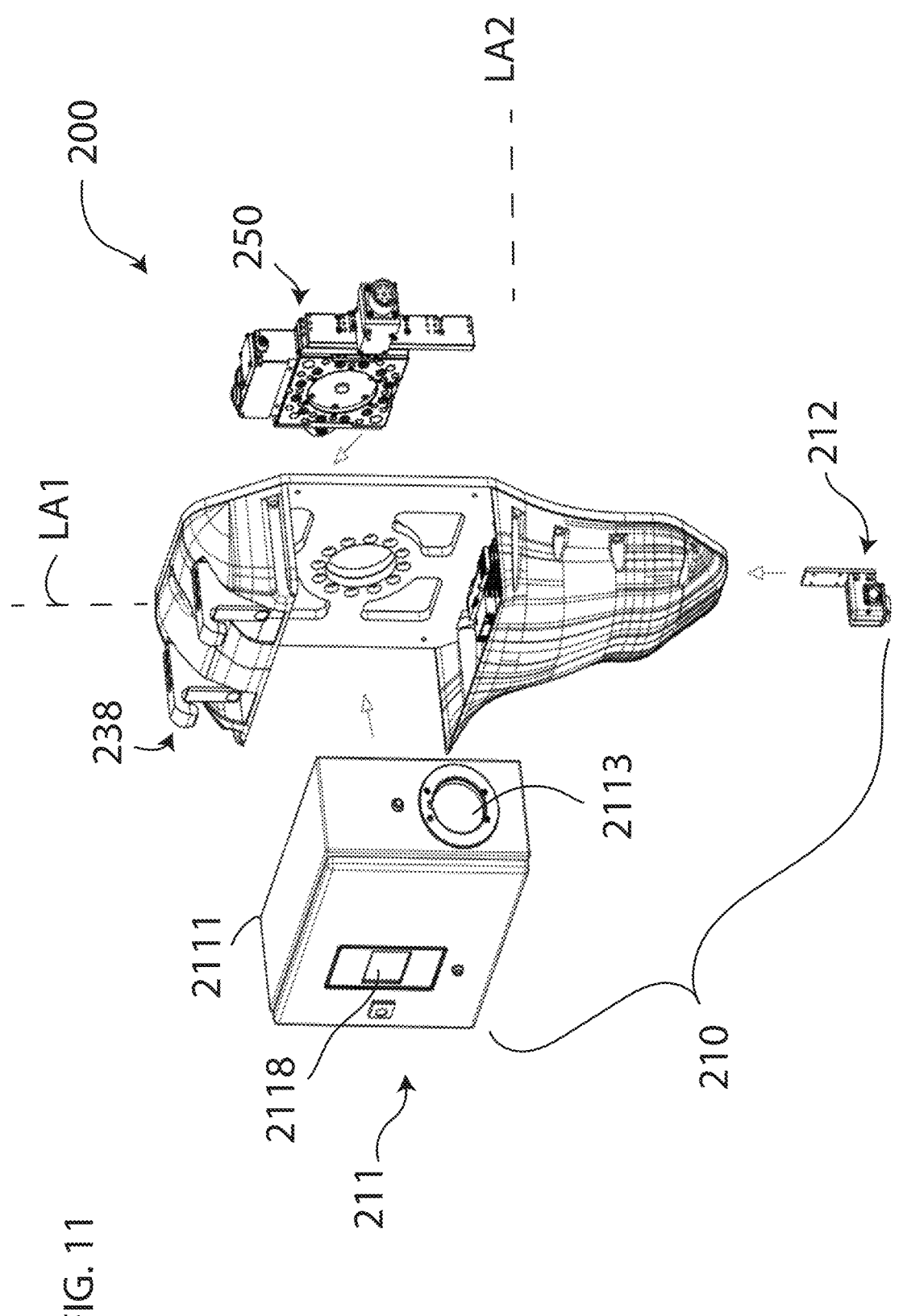
FIG. 11 is an exploded perspective of the surface analyst end effector.
Figure 12:
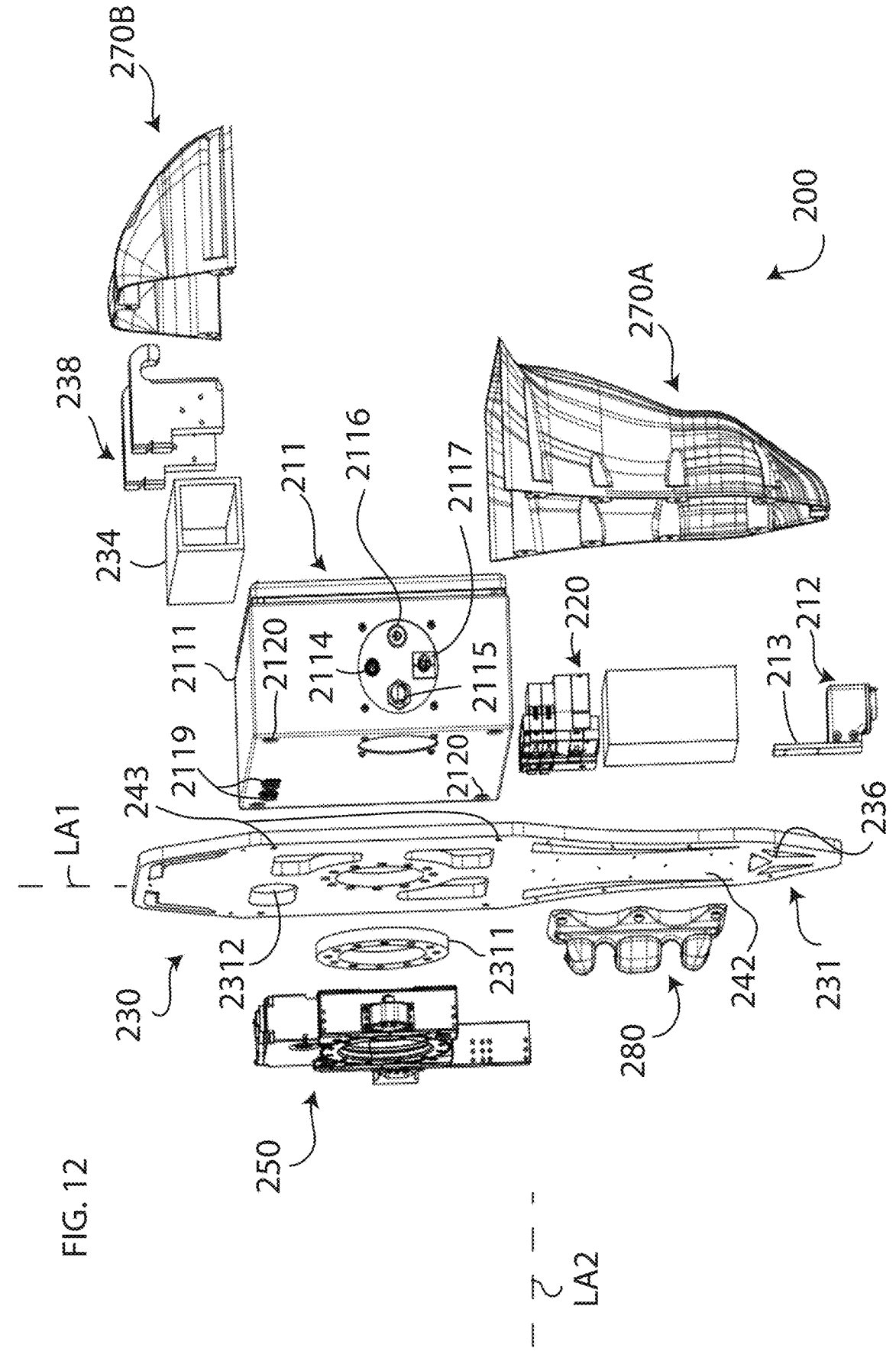
FIG. 12 is another exploded perspective of the surface analyst end effector.

Referring now to FIG. 9, an exemplary embodiment of the JARVIS cell 10 in a configuration for conducting surface analysis is shown schematically. In this configuration the robot 24 is operably (and releasably) coupled to a surface analyst end effector, generally indicated at reference number 200. The surface analyst end effector is configured to releasably connect to the JARVIS robot 24 and be operated by the JARVIS control system 1160. As shown, control and measurement signals are passed between the JARVIS control system 1160 and the end effector 200 via the ESS 50 and an Ethernet line 1167. The end effector 200 is configured to draw power from the ESS 50 via a power line 1169. In general, the JARVIS cell 10 uses the surface analyst end effector 200 to test the bond readiness of composite part surfaces. As will be explained in further detail below, the JARVIS cell 10 is configured to prepare a surface of the composite part for adhesive bonding and subsequently to connect to the surface analyst end effector 200 to conduct an automated bond readiness test. After bond readiness is verified using the surface analyst end effector 200, the JARVIS cell 10 can conduct one or more automated repairs by adhering a repair material (e.g., a patch) to the verified surface. Referring now to FIGS. 10-12, the surface analyst end effector 200 comprises a chassis 230 that supports a surface analyst system 210, an optional I/O device 220, one or more docking hooks 240, and a slave tool changer 250.

The surface analyst system 210 comprises a non-destructive contact angle measuring system. Exemplary embodiments of non-destructive contact angle measuring systems are available from BTG Labs. BTG Labs contact angle measuring systems are configured for use in lab analysis of adhesion processes—not for use on the end of an industrial robot. The inventors have adapted the BTG Labs surface analyst system for use on the end of the JARVIS cell robot 24. The surface analyst system 210 comprises an analyzer control unit 211, an analyzer inspection head 212, and a tether (not shown) configured to fluidly and electrically connect the analyzer control unit to the analyzer inspection head.

The analyzer control unit 211 comprises a cabinet 2111 defining a fluid cartridge bay 2113 in which to receive replaceable fluid cartridges containing the measurement liquid for contact angle measurement. The opposite side of the cabinet 2111 provides a power supply port 2114, an Ethernet port 2115, a main power switch 2116, and a tether connector 2117 for connecting the control unit to the inspection head tether (not shown). The front side of the cabinet 2111 includes a control display 2118, and the back side of the cabinet provides openings for burp valve exhaust 2119 and threaded mounting holes 2120 at four corner regions. Internally, the analyzer control unit 211 further comprises a control module configured to direct the analyzer inspection head 212 to place a drop of the measurement liquid onto a surface and capture an image of the drop of measurement liquid on the surface. The analyzer control unit 211 further comprises a measurement module configured to determine a contact angle of the drop of liquid on the surface based on the image.

The inspection head 212 comprises an automatic dropper configured place a drop of water onto a target surface. The inspection head 212 further comprises an image capture device (e.g., digital camera sensor) configured to capture an image of the target surface. The inspection head 212 further comprises a mounting bracket 213 for fixedly mounting the inspection head on a support.

The illustrated chassis 230 comprises a plate 231 having a proximal end portion 232 and a distal end portion 233 spaced apart along a longitudinal axis LA1. The plate 231 also has a robot interface side and an opposite docking side spaced apart along a latitudinal axis LA2 perpendicular to the longitudinal axis LA1. The plate 231 is configured to mount the slave tool changer 250 on the robot interface side and all other components on the opposite docking side. In the illustrated embodiment, the chassis 230 comprises a tool changer mounting ring 2311 (broadly, a tool changer mount) that attaches to the robot interface side of the plate 230 (e.g., via bolts) for mounting the tool changer 250 on the robot interface side of the chassis. In one or more embodiments, the tool changer mounting ring 2311 defines holes at which bolts can mount the tool changer 250 on the chassis 230.

The docking side of the plate 231 defines spaced apart mounts for mounting the components of the surface analyst system 210 to the chassis 230. The distal end portion of the plate 231 defines an inspection head mount 236 configured to mount the inspection head 212 so that the inspection head faces generally distally along the longitudinal axis LA1. In one or more embodiments, the inspection head mount 236 comprises holes (e.g., threaded holes) formed in the plate at which bolts (broadly, removable fasteners) can fasten the inspection head mounting bracket 213 to the base. The plate 231 further defines a control unit mount 243 configured to mount the control unit 211 at a location spaced apart proximally from the inspection head 212. In the illustrated embodiment, the control unit mount 243 comprises holes (e.g., threaded holes) formed in the plate at which bolts (broadly, removable fasteners) can fasten to the mounting holes 2120 of the control unit cabinet 2111.

The end effector 200 further comprises an end effector body made up of distal and proximal body parts 270A, 270B. The distal body part 270A mounts on the chassis plate 231 immediately distal of the control unit 211, and the proximal body part 270B mounts to the chassis plate immediately proximal of the control unit so that the control unit is secured between the body parts with three sides of the control unit exposed. The exposed sides of the control unit 211 provide access to the fluid cartridge bay 2113, the display 2118, the cable access points 2114, 2115, 2117, and the main power switch 2116. In the illustrated embodiment, the chassis plate 231 comprises an exhaust opening 2312 that aligns with the burp exhaust ports 2119 so that the burp exhaust ports are not obstructed. The distal body part 270 defines a distal end opening through which the inspection head 212 is exposed.

The chassis 230 is configured so that the docking hooks 238 mount on the docking side of the chassis at a location spaced apart proximally from the control unit 211. In the illustrated embodiment, the chassis 230 comprises a hook spacer 234 between the docking hooks 238 and the chassis plate 231. The spacer 234 can be attached to the chassis plate 231 proximally of the control unit 2111 in any suitable fashion (e.g., via welding or removable fasteners), and the docking hooks 238 can be mounted on the spacer 234 in any suitable fashion (e.g., via welding or removable fasteners). Accordingly, in the illustrated embodiment, the spacer 234 functions as a hook mount for mounting the docking hooks 238 on the docking side chassis 230 at a location proximal of the surface analyst system 210. The proximal body part 270B mounts over the docking hooks 238 but has a pair of slots that expose the docking hooks so that they are operable to hang the end effector 200 in an MTC 110.

It can be seen that the hook mount 234 and the tool changer mount 2311 mount the docking hooks 238 and the slave tool changer 250 on opposite sides of the chassis 230. The docking hooks 238 are configured to hang the end effector 200 in an MTC 110 of the JARVIS cell 10. The docking hooks 238 suspend the end effector 200 so that the slave tool changer 250 faces the doorway of the MTC 110. This allows the robot 24 to access the slave tool changer 250 through the MTC doorway to operatively connect to the end effector 200 in the MTC 110. When the robot 24 is finished using the surface analyst effector 205, the robot 24 can move the end effector through the doorway, hang the end effector in the MTC 110 by the docking hooks 238, and disconnect from the master tool changer 26.

Figure 13:
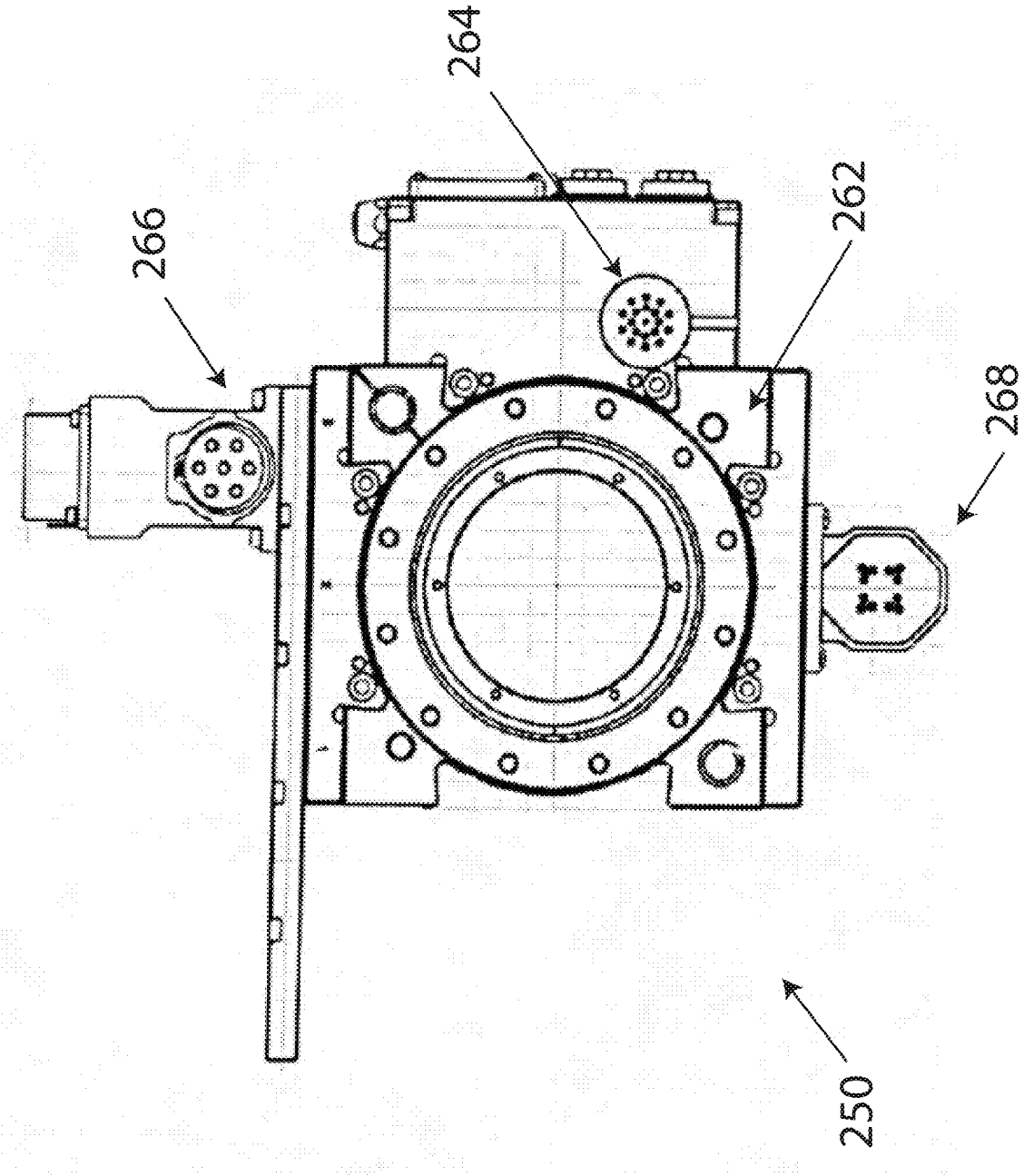
FIG. 13 is an elevation of a slave tool changer of the surface analyst end effector.

Referring to FIG. 13, the slave tool changer 250 is configured to releasably and operatively connect the surface analyst end effector 200 to the master tool changer 26 of robot 24 such that the robot can move the surface analyst end effector 200 along the composite part and the JARVIS cell 10 can power the end effector and signal the end effector to conduct bond readiness tests. The illustrated slave tool changer 250 comprises a mounting interface 262 configured for selectively mounting the end effector 200 on the master tool changer 26. The mounting interface 262 comprises a signal connector 264 configured to couple to the mating signal connector 2614 of the master tool changer 26 so that the master tool changer can determine (i) that it has been properly aligned with the slave tool changer for locking and (ii) that it has been connected to the surface analyst effector 200, as opposed to another robotic tool. After the locking actuator 2612 of the master tool changer 26 locks the slave tool changer 250 to the master tool changer, the tool changers 26, 250 support the surface analyst end effector 200 on the end of the industrial robot 24 for bond readiness testing. The slave tool changer 250 further comprises a power connector 266 and an Ethernet connector 268, respectively configured to mate with the power connector 2620 and the Ethernet connector 2622 of the master tool changer 26. The mating connectors 2620, 266 convey power from the JARVIS cell 10 to the end effector 205, and the mating connectors 2622, 268 transfer control and data signals between the JARVIS control system 1160 and the end effector as shown in FIG. 9.

It is now apparent that the end effector 200 comprises cabling (not shown) that runs from the surface analyst control unit 211 to the slave tool changer 250 and the inspection head 212. To neatly accommodate the cabling so it is out of the way of the surface analyst system 210 and tool changer 250, the illustrated end effector 200 comprises a cabling nest 280 mounted on the robot interface side of the chassis 230 via a wire nest mount 242. The wire nest 280 is mounted along the longitudinal axis LA1 so that the control unit 211 and the tool changer 250 are proximal of the wire nest and the inspection head 212 is distal of the wire nest. An can be seen any excess length of cabling can be wrapped around the cabling nest 280.

Figure 14:
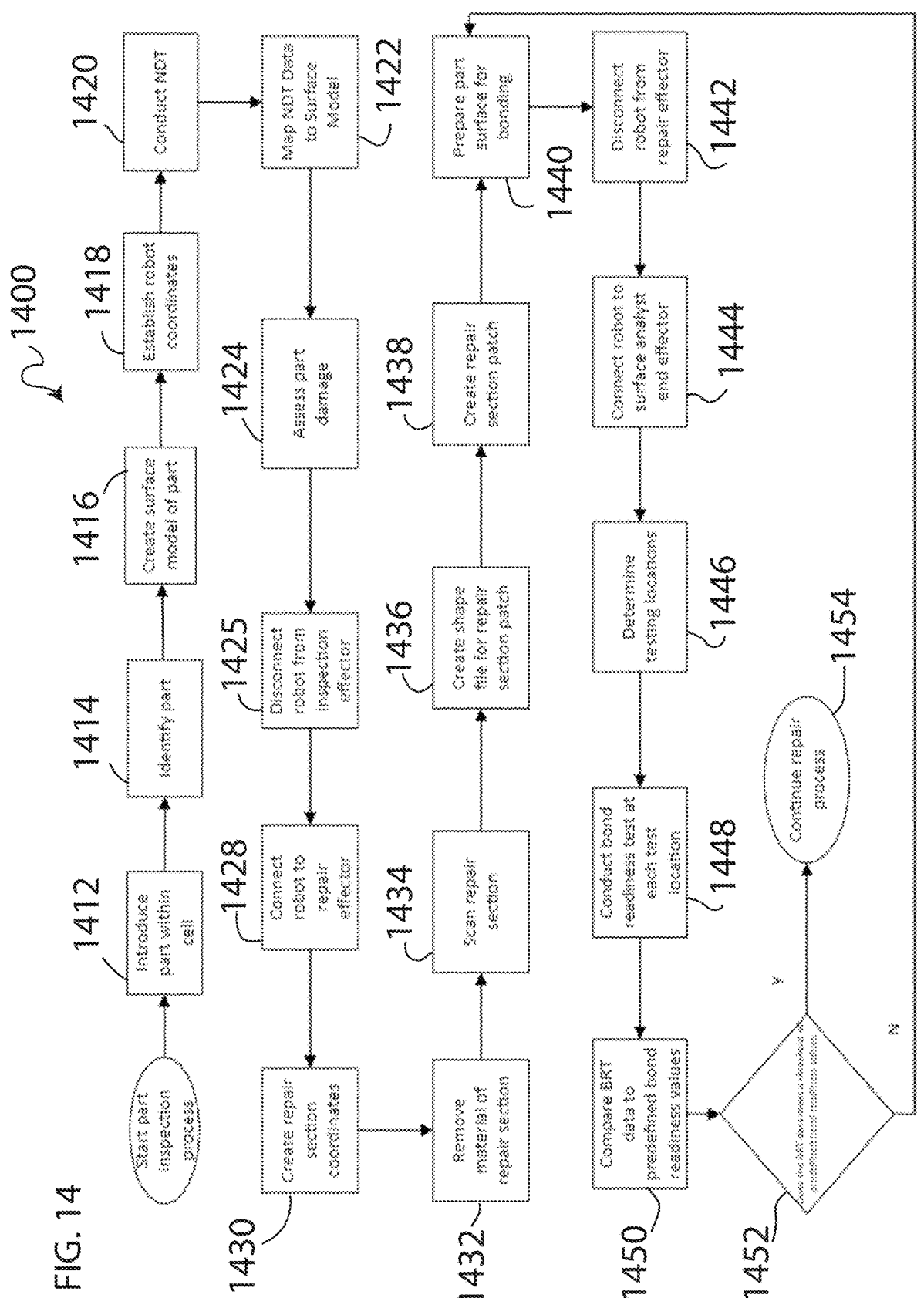
FIG. 14 is a flow chart illustrating steps and decision points of a method of automated inspection and repair using the JARVIS cell and the surface analyst end effector.

Referring to FIG. 14, an exemplary method of using the JARVIS cell in an inspection and repair process that utilizes the surface analyst end effector 200 is shown at reference number 1400 and will now be briefly described. After a composite part is loaded into the JARVIS cell 10 (step 1412) and any desired part identification processes are conducted (step (step 1414), the JARVIS cell 10 uses its laser scanners to obtain a three-dimensional (3D) model of the part (step 1416). The JARVIS software framework then maps 3D model to robot positioning coordinates for the JARVIS robot (step 1418) so that subsequent robot actions are coordinated in relation to the location of the part inside the cell 10.

After the 3D model is obtained and mapped to the robot coordinate system, non-destructive testing (NDT) is conducted (step 1420). During inspection, NDT techniques such as laser shearography, pulsed thermography, ultrasonic imaging, etc., are used to obtain NDT images of the part. For each NDT technique applied, the robot 24 can use the master tool changer 26 to couple to the corresponding end effector in a modular tool cartridge 110, and then the JARVIS control system 1160 can control the robot and the end effector to take the NDT images. After each NDT process is complete, the robot 24 automatically docks the NDT end effector in its modular tool cartridge 110 and disconnects from the end effector at the master tool changer 26.

The JARVIS software framework can stitch together overlapping NDT images as described in U.S. patent application Ser. No. 17/828,558. The JARVIS software framework can also and map the stitched composite NDT images to the part model (step 1422) and store the image-wrapped model in the JARVIS database as a digital twin for the composite part. Based on the NDT images, the JARVIS software or a human inspector identifies any damage to the composite part (step 1424). The JARVIS software framework then maps a bounding box for each damage area to robot positioning coordinates to create repair section coordinates from which scarfing and surface preparation tool paths can be generated (step 1430).

After determining the repair section coordinates, the JARVIS cell 10 is configured to automatically perform at least certain steps of a repair process. As explained in U.S. patent application Ser. No. 17/828,558, the JARVIS cell 10 is configured to automatically perform both skin scarf patch repairs and core splice repairs. This disclosure focuses on skin scarf patch repairs, and particularly the role of the surface analyst end effector 200 in making a skin scarf repair.

Initially, the JARVIS software framework operates the robot 24 to connect (via master tool changer 26) to a milling end effector (not shown) (steps 1426, 1428). Then, based on the repair section coordinates determined above, the JARVIS software framework controls the robot 24 and the milling end effector to remove a predefined geometry of skin material from the composite part near the damaged area (step 1432).

After the skin material has been removed from the scarf area, the JARVIS cell can scan the repair section (step 1434) to determine the geometry for a repair patch (steps 1436, 1438). Next, the JARVIS cell prepares the surface of the scarf area for adhesive bonding (step 1440). In this step, the JARVIS cell 10 directs the robot to dock the previous effector in the corresponding MTC 110. Then the JARVIS cell 10 directs the robot 24 to couple to an atmospheric plasma end effector 101 of the type described in U.S. Provisional Patent Application No. 63/271,506, which is hereby incorporated by reference in its entirety. The robot 24 then moves the atmospheric plasma end effector (not shown) along the defined tool path while the atmospheric plasma system operates to clean the surface and increase surface free energy for adhesive bonding.

After preparing the surface in step 1440, the JARVIS cell 10 is configured to conduct bond readiness testing. In step 1442, the robot 24 docks the surface preparation end effector in the corresponding MTC 110. Then the robot 24 connects to the surface analyst end effector 200 in the MTC 110 (step 1444). The robot 24 aligns the master tool changer 26 with the slave tool changer 250 and brings the tool changers together until the connectors 2614, 264 are mated. This signals the master tool changer 26 that it is operatively aligned with the surface analyst end effector 200. In response, the master tool changer 26 actuates the locking actuator 2612 to lock the slave tool changer 250 to the master tool changer.

Next, the JARVIS cell 10 uses the surface analyst end effector 200 to determine bond readiness of the prepared part surface. In step 1446, the JARVIS control system 1160 is configured to automatically determine a plurality of testing locations at which to conduct bond readiness tests. Various methods of determining testing locations can be used without departing from the scope of the disclosure. In one or more embodiments, the JARVIS control system is configured to perform a bond readiness test at a predefined number of testing locations for each prepared surface. The control system 1160 defines testing locations at the predefined number of equally spaced locations along the perimeter portion of the prepared surface and conducts bond readiness tests at each defined testing location.

In step 1448, the JARVIS control system 1160 is configured to sequentially move the end effector 200 to each defined testing location and direct the surface analyst system 210 to conduct a bond readiness test at each testing location. During each bond readiness test, the analyzer control unit 211 (upon actuation from the JARVIS control system 1160) signals the inspection head 212 to place a drop of liquid at the test location and capture an image of the drop of liquid on the part surface. The control unit 211 is configured to measure a contact angle of the drop of liquid and compare the measured contact angle to one or more predefined thresholds of predefined contact angle limit values stored in memory (step 1450). At decision point 1452, the JARVIS control system 1160 determines whether the prepared surface is ready for bonding based on the output from the comparison conducted by the surface analyst system 210 at each testing location. If the measured contact angle at each testing location is within the acceptable range of contact angles, then the JARVIS control system 1160 determines the part is ready for bonding to a repair patch, proceeding to repair process 1454. Conversely, if the measured contact angle at any location is outside the acceptable contact angle range, then the control system 1160 determines the part is not ready for bonding. The control system 1160 repeats steps 1440-1452 until acceptable contact angles are achieved at all testing locations.

After the surface is treated and bond readiness is established by testing, a scarf repair patch can be applied to the treated area. The patch can be machined and the adhesive can be applied using the principles described in U.S. patent application Ser. No. 17/828,558.

For some multilayer scarf repairs, after a first patch is adhered to the repair area, before a subsequent patch is applied, the JARVIS cell 10 can optionally repeat the surface treatment and bond readiness test sub-processes for each subsequent patch.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

15
16

What is claimed is:

1. A surface analyst end effector for an automated inspection and repair system for composite parts, the surface analyst end effector comprising:

a chassis;

a surface analyst system supported on the chassis for movement with the chassis, the surface analyst system including a control unit and an analyzer inspection head, the control unit configured to conduct a bond readiness test by which the control unit directs the analyzer inspection head to place a drop of liquid onto a surface of a composite part and direct the analyzer inspection head to capture one or more images of the drop of liquid on the surface; and a slave tool changer secured to the chassis, the slave tool changer configured to releasably and operatively connect the surface analyst end effector to an industrial robot such that the industrial robot can move the surface analyst end effector along the composite part and signal the surface analyst system to conduct a bond readiness test at one or more locations along the composite part.

2. The surface analyst end effector of claim 1, further comprising a docking hook secured to the chassis for suspending the surface analyst end effector in a ready position when disconnected from the industrial robot.

3. The surface analyst end effector of claim 2, wherein the chassis has a proximal end portion and a distal end portion spaced apart along a longitudinal axis, wherein the analyzer inspection head is located adjacent the distal end portion and the docking hook is located adjacent the proximal end portion.

4. The surface analyst end effector of claim 2, wherein the docking hook and the slave tool changer are on opposite sides of the chassis.

5. The surface analyst end effector of claim 1, wherein the surface analyst system is configured to draw power through the slave tool changer from a power system of the automated inspection and repair system and to receive control signal through the slave tool changer from a master controller of the automated inspection and repair system.

6. The surface analyst end effector of claim 1, further comprising a power supply mounted on the chassis.

7. The surface analyst end effector of claim 6, further comprising an I/O device mounted on the chassis.

8. The surface analyst end effector of claim 7, further comprising an enclosure enclosing the control unit, the power supply, and the I/O device.

9. The surface analyst end effector of claim 1, wherein the surface analyst system is configured to measure a contact angle of each the drop of liquid and to use the measured contact angle to output an indication of surface free energy.

10. A method of repairing a composite part, the method comprising:

connecting an industrial robot to an inspection end effector and inspecting the composite part with the inspection end effector;

subsequently disconnecting the inspection end effector from the industrial robot, connecting the industrial robot to a surface preparation end effector, and preparing a surface of the composite part for bonding using the surface preparation end effector to obtain a prepared surface area;

subsequently disconnecting the surface preparation effector from the industrial robot, connecting the industrial robot to the surface analyst end effector of claim 1 and using the surface analyst end effector to determine bond readiness of the prepared surface area; and subsequently adhering a repair patch to the prepared surface area.

11. The method of claim 10, further comprising determining based on the inspection of the composite part with the inspection end effector a damaged area of the composite part.

12. The method of claim 11, further comprising scarfing the damaged area of the composite part to obtain a scarfed area, wherein said preparing the surface of the composite part comprises preparing the scarfed area.

13. The method of claim 12, wherein said using the surface analyst end effector comprises using the surface analyst end effector to conduct bond readiness tests at a plurality of test locations along the prepared surface area.

14. The method of claim 13, wherein said using the surface analyst end effector comprises, at each of the plurality of test locations, placing a drop of liquid at the test location, measuring a contact angle of the drop of liquid at the test location, and comparing the measured contact angle to one or more predefined contact angle limit values.

15. The method of claim 13, further comprising, before inspecting the composite part, scanning the composite part to obtain a three dimensional model of the composite part and mapping the three dimensional model to robot positioning coordinates for the industrial robot to coordinate movement of the industrial robot in relation to the composite part.

16. The method of claim 15, further comprising determining the plurality of test locations in terms of robot positioning coordinates.

17. The method of claim 16, further comprising determining a location of the damaged area in terms of robot positioning coordinates, determining a scarfing tool path in terms of robot coordinates based on the determined location of the damaged area in terms of robot positioning coordinates, and determining a surface preparation tool path in terms of robot coordinates.

18. The method of claim 17, wherein said determining the plurality of test locations comprises determining a predefined number of equally spaced locations about a perimeter portion of the prepared surface area.

19. An automatic inspection and repair system comprising:

an industrial robot;

a master tool changer on an end of the industrial robot;

a plurality of end effectors interchangeably connectable to the industrial robot via the master tool changer, one of the plurality of end effectors comprising the surface analyst end effector of claim 1; and a control system configured to control both the industrial robot and the plurality of end effectors, wherein when the surface analyst end effector is connected to the industrial robot via the master tool changer, the control system is configured to control the industrial robot and the surface analyst end effector to coordinate robot positioning and conducting of one or more bond readiness tests using the surface analyst system to determine bond readiness.

20. The industrial robot system as set forth in claim 19, further comprising another robot end effector for performing a composite part inspection and repair process selected from a list of composite part inspection and repair processes consisting of: non-destructive testing, surface preparation, scarfing, and patch making;

wherein the industrial robot comprises a master tool changer configured to interchangeably connect to the surface analyst end effector and said another robot end effector and wherein the control system is further configured to control the industrial robot and said another end effector to coordinate movement of the industrial robot with use of said another robot end effector for performing said composite part inspection and repair task on the composite part.

* * * * *